(12) United States Patent
Wan et al.

(10) Patent No.: US 8,451,568 B2
(45) Date of Patent: May 28, 2013

(54) REMOTELY-CONTROLLABLE CIRCUIT BREAKER

(75) Inventors: Jiasheng Wan, Wuhan (CN); Zhiqiang Wang, Wuhan (CN)

(73) Assignee: Hubei Shengjia Electric Apparatus Co., Ltd., Wuhan (CN)

( * ) Notice: Subject to any disclaimer, the term of this patent is extended or adjusted under 35 U.S.C. 154(b) by 254 days.

(21) Appl. No.: 12/774,875

(22) Filed: May 6, 2010

(65) Prior Publication Data

US 2011/0273817 A1 Nov. 10, 2011

(51) Int. Cl.
*H02H 3/16* (2006.01)
(52) U.S. Cl.
USPC .............................................. 361/42; 361/44
(58) Field of Classification Search
USPC ...................................... 361/42–50
See application file for complete search history.

(56) References Cited

U.S. PATENT DOCUMENTS 5,861,784 A * 1/1999 Heise et al. ...................... 335/20
6,084,756 A * 7/2000 Doring et al. .................... 361/45

* cited by examiner

*Primary Examiner* — Danny Nguyen
(74) *Attorney, Agent, or Firm* — Matthias Scholl P.C.; Matthias Scholl

(57) ABSTRACT

The invention relates to a remotely-controllable circuit breaker, including a first circuit breaking unit, remote control unit, and housing. The first circuit breaking unit and the remote control unit are disposed in the housing; the first circuit breaking unit operates to switch on or off loads and electric lines; the remote control unit operates to control the interruption of the remotely-controllable circuit breaker via a remote control signal; and the housing is made of insulating and flame-retardant materials.

38 Claims, 6 Drawing Sheets

REMOTELY-CONTROLLABLE CIRCUIT BREAKER

BACKGROUND OF THE INVENTION

1. Field of the Invention

The invention relates to a circuit breaker, and more particularly to a remotely-controllable circuit breaker.

2. Description of the Related Art

Nowadays, circuit breakers are widely used for protecting and controlling electrical power transmission networks. As shown in FIG. 1, a circuit breaker in the prior art comprises a firewire input end 032 and a firewire output end 037 connected to electric lines; an operating portion, comprising a lever 021 having an operating end disposed outside a housing 001 and operating to switch on or off a circuit; a first movable contact 024 having a first movable contact point 025 disposed on one end thereof; a linkage control block 022 comprising multiple linkage parts and rotating with respect to a shaft in the housing 001, one end of the uppermost linkage part 0221 being connected to the lever 021, and one end of the lowest linkage part 0222 being connected to the front end 023 of the first movable contact; and a static contact point 031 connected to the firewire input end 032. As the lever 021 rotates, the linkage control block 022 forces the first movable contact 024 to move, thereby implementing attachment and detachment between the first movable contact point 025 and the static contact point 031, and thus switch-on and switch-off of the electric lines. The circuit breaker further comprises an arc extinguishing portion and an overcurrent protecting portion 051. The arc extinguishing portion operates to prevent an electric arc from damaging the circuit breaker, and comprises a metal plate 033 and an arc-extinguishing cover 035. The metal plate 033 is connected to the static contact point 031 and extends to the bottom of the housing 001. The arc-extinguishing cover 035 corresponds to the static contact point 031. The overcurrent protecting portion 051 is an electromagnetic release disposed below the operating portion. One end of the overcurrent protecting portion 051 is connected to the removable contact, with its other end connected to one end of the linkage part 052. The other end of the linkage part 052 is connected to the linkage control block 022. As over current occurs on the electric lines, the first movable contact point is separated from the static contact point, thereby disconnecting the loads from the electric lines.

However, there are several un-neglectable problems with the existing circuit breaker: first, the circuit breaker cannot be remotely controlled; if a load is to be disconnected from the electric lines for any reason (such as an unpaid bill) via the circuit breaker, an operator needs to go to the site and solve the problem, which reduces operational efficiency. Second, after long-term use, adhesion occurs between the first movable contact point and the static contact point, which reduces the safety of the circuit breaker. Third, when a power failure occurs, users cannot determine whether the circuit breaker failed and often blindly repair the circuit breaker, which reduces the safety. Finally, if the circuit breaker fails, no clear indication is given to the users, which makes it impossible to reset the circuit breaker in a timely manner and use electricity normally.

SUMMARY OF THE INVENTION

In view of the above-described problem, it is one objective of the invention to provide a remotely-controllable circuit breaker that is capable of addressing the above-mentioned problems.

To achieve the above objectives, in accordance with one embodiment of the invention, provided is a remotely-controllable circuit breaker, comprising a first circuit breaking unit, a remote control unit, and a housing, wherein the first circuit breaking unit and the remote control unit are disposed in the housing, the first circuit breaking unit operates to switch on or off loads and electric lines, the remote control unit operates to control the interruption of the remotely-controllable circuit breaker via a remote control signal, and the housing is made of insulating and flame-retardant materials.

In a class of this embodiment, the first circuit breaking unit comprises a first operating portion, an arc extinguishing portion, an overcurrent protecting portion, and a first terminal; the first operating portion operates to switch on or off the loads and the electric lines; the arc extinguishing portion operates to prevent an arc from corrupting the remotely-controllable circuit breaker; the overcurrent protecting portion operates to prevent overcurrent from damaging the remotely-controllable circuit breaker; and the first terminal is connected to a phase line.

In a class of this embodiment, the first operating portion comprises a lever, a first movable contact, a linkage control block comprising multiple linkage parts, and a static contact point; one end of the lever is disposed outside the housing and operates to switch on or off the electric lines; a first movable contact point is disposed on one end of the first movable contact; the linkage parts are hinge-connected to each other; one end of the uppermost linkage part is connected to the lever and one end of the lowest linkage part is connected to the front end of the first movable contact; the static contact point is connected to the first terminal; and a fluorescent coating is disposed on the static contact point and the first movable contact point.

In a class of this embodiment, the overcurrent protecting portion is disposed below the first operating portion; one end of the overcurrent protecting portion is connected to the first movable contact, while the other end thereof is connected to a support linkage part of the linkage control block; the overcurrent protecting portion is an electromagnetic release, and the overcurrent protecting portion separates the first movable contact point from the static contact point, thereby disconnecting the loads from the electric lines when an over-current condition occurs on the electric lines.

In a class of this embodiment, the remote control unit comprises a disconnecting portion and a control circuit; the disconnecting portion operates to disconnect the loads from the electric lines; and the control circuit is connected to the disconnecting portion and operates to control the disconnecting portion.

In a class of this embodiment, the disconnecting portion comprises a first electromagnet having a magnet core and a first armature; the first armature is disposed below the linkage part; and one end of the first electromagnet corresponds to the first armature.

In a class of this embodiment, the control portion comprises a power supply circuit and a power supply control circuit; the power supply circuit is connected to the electromagnet coil of the disconnecting portion, thereby supplying power to it; and the power supply control circuit operates to switch on or off the power supply circuit, thereby controlling the operation of the disconnecting portion.

In a class of this embodiment, the power supply circuit is a rectifying circuit; an output end of the power supply circuit is connected to an input end of the electromagnetic coil of the first electromagnet; and an input end of the power supply circuit and output end of the electromagnetic coil of the electromagnet are respectively connected to a phase line terminal and a zero line terminal of an output terminal of the electric line.

In a class of this embodiment, the power supply control circuit comprises a first photoelectric coupler and a thyristor; one output end of the first photoelectric coupler is connected to a cathode of the power supply circuit; the first photoelectric coupler operates to transmit a control signal; the other output end of the first photoelectric coupler is connected to a control end of the thyristor; and the other two ends of the thyristor are connected to a cathode and anode of the power supply circuit, whereby the control circuit is switched on or off.

In a class of this embodiment, it further comprises an over-voltage protecting portion operating to output a control signal, thereby disconnecting the loads from the electric lines when over-voltage occurs on the electric lines.

In a class of this embodiment, the over-voltage protecting portion comprises a voltage signal sampling circuit and an over-voltage determining circuit comprising a comparator; the voltage signal sampling circuit is connected to a cathode of the rectifying circuit, thereby obtaining the voltage of the electric lines; an output end of the voltage signal sampling circuit is connected to an in-phase input end of the comparator an output end of the comparator is connected to a control end of the thyristor; and the comparator enables the disconnecting portion to disconnect the loads from the electric lines when the voltage on the in-phase input end of the comparator exceeds a reference voltage on an anti-phase input end thereof.

In a class of this embodiment, it further comprises a slide rheostat operating to adjust a maximum permitted voltage.

In a class of this embodiment, the slide rheostat is disposed between the in-phase input end of the comparator and the ground, or between the anti-phase input end of the comparator and the ground.

In a class of this embodiment, the over-voltage determining circuit further comprises an analog-to-digital converter and a processor; the cathode of the rectifying circuit is connected to an input end of the analog-to-digital converter, an output end of the analog-to-digital converter is connected to an input end of the processor; and the processor switches the thyristor on or off.

In a class of this embodiment, the power supply control circuit comprises a first photoelectric coupler and a thyristor; one control end of the first photoelectric coupler is connected to the ground; the first photoelectric coupler operates to transmit a control signal; one output end of the first photoelectric coupler is connected to a control end of the thyristor, while the other output end of the first photoelectric coupler is connected to one end of the capacitor, where the other end of the capacitor is connected to the ground, and the other two ends of the thyristor are connected to a cathode and an anode of the power supply circuit, whereby the control circuit is switched on or off.

In a class of this embodiment, it further comprises an over-voltage protecting portion operating to output a control signal, thereby disconnecting the loads from the electric lines when over-voltage occurs on the electric lines.

In a class of this embodiment, the over-voltage protecting portion comprises a voltage signal sampling circuit and an over-voltage determining circuit comprising a comparator; the voltage signal sampling circuit is connected to a cathode of the rectifying circuit whereby it obtains the voltage of the electric lines; an output end of the voltage signal sampling circuit is connected to an in-phase input end of the comparator; an output end of the comparator is connected to a control end of the thyristor; and the comparator enables the disconnecting portion to disconnect the loads from the electric lines when the voltage on the in-phase input end of the comparator exceeds a reference voltage on an anti-phase input end thereof.

In a class of this embodiment, it further comprises a slide rheostat operating to adjust a maximum permitted voltage.

In a class of this embodiment, the slide rheostat is disposed between the in-phase input end of the comparator and the ground, or between the anti-phase input end of the comparator and the ground.

In a class of this embodiment, the over-voltage determining circuit further comprises an analog-to-digital converter and a processor; the cathode of the rectifying circuit is connected to an input end of the analog-to-digital converter; an output end of the analog-to-digital converter is connected to an input end of the processor; and the processor switches the thyristor on or off.

In a class of this embodiment, the power supply control circuit comprises a photoelectric receiving tube and a thyristor; the photoelectric receiving tube receives an optical signal from a remote control center via optical fiber and a connector; an output end of the photoelectric receiving tube is connected to the ground, a control end of the thyristor is connected to the other end of the photoelectric receiving tube, and the other two ends of the thyristor are connected to a cathode and an anode of the power supply circuit, whereby switching on or off the control circuit.

In a class of this embodiment, it further comprises an over-voltage protecting portion operating to output a control signal whereby it disconnects the loads from the electric lines when over-voltage occurs on the electric lines.

In a class of this embodiment, the over-voltage protecting portion comprises a voltage signal sampling circuit and an over-voltage determining circuit comprising a comparator; the voltage signal sampling circuit is connected to a cathode of the rectifying circuit whereby it obtains the voltage of the electric lines; an output end of the voltage signal sampling circuit is connected to an in-phase input end of the comparator; an output end of the comparator is connected to a control end of the thyristor; and the comparator enables the disconnecting portion to disconnect the loads from the electric lines when a voltage on the in-phase input end of the comparator exceeds a reference voltage on an anti-phase input end thereof.

In a class of this embodiment, it further comprises a slide rheostat operating to adjust a maximum permitted voltage.

In a class of this embodiment, the slide rheostat is disposed between the in-phase input end of the comparator and the ground, or between the anti-phase input end of the comparator and the ground.

In a class of this embodiment, the over-voltage determining circuit further comprises an analog-to-digital converter and a processor; the cathode of the rectifying circuit is connected to an input end of the analog-to-digital converter; an output end of the analog-to-digital converter is connected to an input end of the processor; and the processor switches the thyristor on or off.

In a class of this embodiment, it further comprises a feedback circuit, comprising a light emitting diode (LED) having an end connected to a cathode of the power supply circuit, with the other end connected to the ground.

In a class of this embodiment, an output end of the LED outputs an optical signal, and this optical signal is transmitted to a remote control device via the optical fiber and the plug as the electric line is connected.

In a class of this embodiment, it further comprises a feedback circuit, comprising a second photoelectric coupler having an end connected to a cathode of the power supply circuit, with the other end connected to the ground.

In a class of this embodiment, an output end of the second photoelectric coupler outputs a switching signal to a remote control device as the electric line is connected.

In a class of this embodiment, it further comprises a signal receiving circuit operating to receive a wireless control signal from outside, a decoding circuit connected to the signal receiving circuit and operating to decode the wireless control signal and to obtain a digital control signal, and a parsing circuit operating to parse the digital control signal, to transform the digital control signal into a voltage signal, and to transmit the voltage signal to the power supply control circuit.

In a class of this embodiment, it further comprises a second circuit breaking unit operating to disconnect the loads from the electric lines in the event that the first circuit breaking unit fails.

In a class of this embodiment, the second circuit breaking unit comprises a detecting circuit operating to detect whether the first circuit breaking unit fails, and a second operating portion operating to disconnect the loads from the electric lines when the first circuit breaking unit fails.

In a class of this embodiment, the detecting circuit comprises a contact switch and a second electromagnet; the contact switch is disposed below the lever; one end of the contact switch is connected to an end of the first movable contact via a wire; the second electromagnet is disposed on a support in the housing; an input end of the second electromagnet is connected to the wire; an output end of the second electromagnet is connected to a zero line terminal; the contact switch is switched on as the level is switched to an open circuit position; and the second electromagnet operates when no phase line is disconnected.

In a class of this embodiment, the second operating portion comprises a rotatable frame, a rotatable plate, a second movable contact, and a connecting frame; the rotatable frame rotates with respect to a hinged shaft and has a lap surface; one end of the magnet core abuts against the rotatable frame; the rotatable plate rotates with respect to the hinged shaft; one end of the rotatable plate abuts against the lap surface of the rotatable frame; the second movable contact is disposed in the support and comprises a T-shaped holder and spring; the spring is fit on the T-shaped holder; a conductive contact point is disposed on one end of the T-shaped holder; the other end of the T-shaped holder abuts against the other end of the rotatable plate; and a second terminal is disposed in the connecting frame and connected to the phase line via a pair of stationary contacts.

In a class of this embodiment, a top portion of the housing corresponding to the static contact point is made of transparent insulating and flame-retardant materials.

In a class of this embodiment, it further comprises a first indicating lamp operating to indicate whether the switch-off function of the first circuit breaking unit fails; a second indicating lamp connected to the zero line and the first terminal, and operating to indicate whether there is voltage on the electric lines; and a power conversion circuit operating to convert the voltage of the electric lines and thereby supply power to the first indicating lamp and the second indicating lamp.

In a class of this embodiment, the housing is made of transparent insulating and flame-retardant materials.

The advantages of the invention: first, the remote control implements remote power-on and power-off, which reduces the labor cost and electricity management cost; second, photoelectric isolation guarantees the safety of the operators; third, the second circuit breaking unit disconnects the loads from the electric lines as adhesion between the first movable contact point and the static contact point occurs, which improves safety; fourth, the second indicating lamp makes it possible to clearly determine whether power failure occurs or the circuit breaker fails, which prevents blind repairs; finally, the first indicating lamp indicates in a timely manner whether the switch-off function of the first circuit breaking unit fails, and thus the safety of the circuit breaker is improved.

BRIEF DESCRIPTION OF THE DRAWINGS

The invention is described hereinafter with reference to the accompanying drawings, in which.

DETAILED DESCRIPTION OF THE EMBODIMENTS

Figure 1:
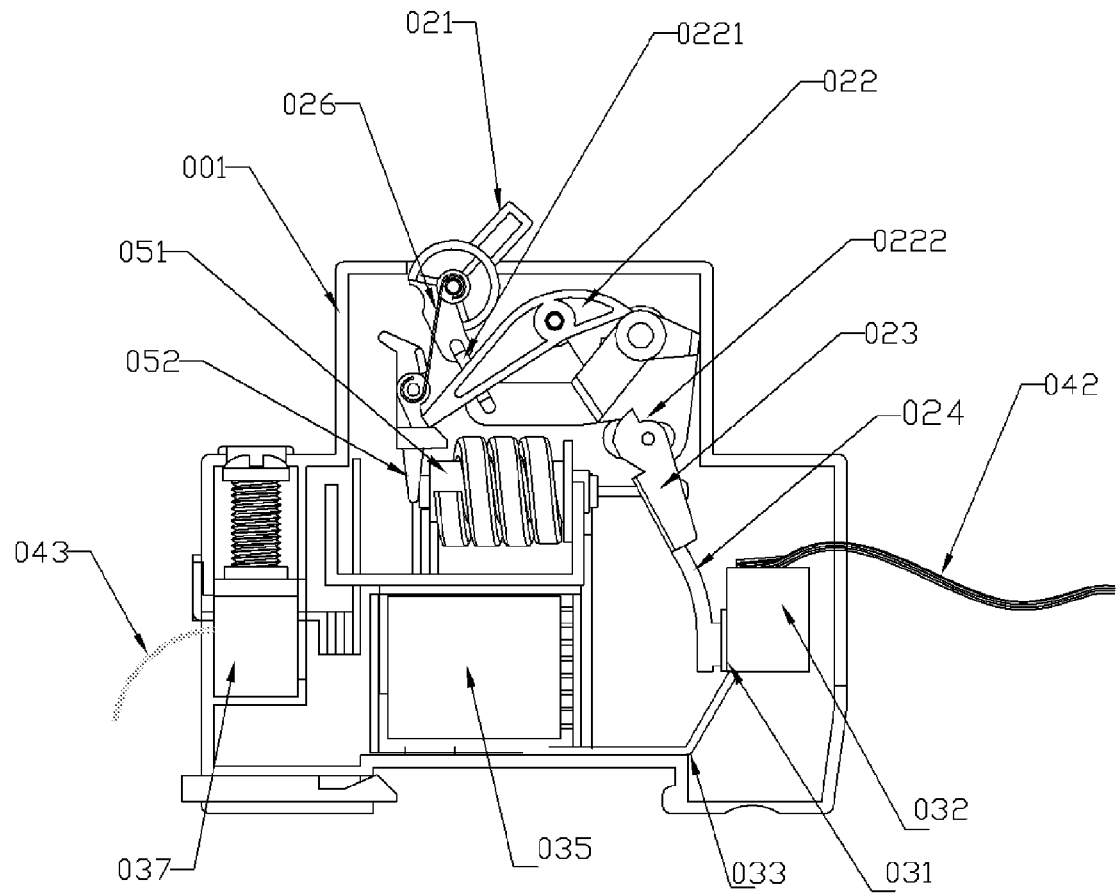
FIG. 1 is a schematic view of a circuit breaker in the prior art.
Figure 2:
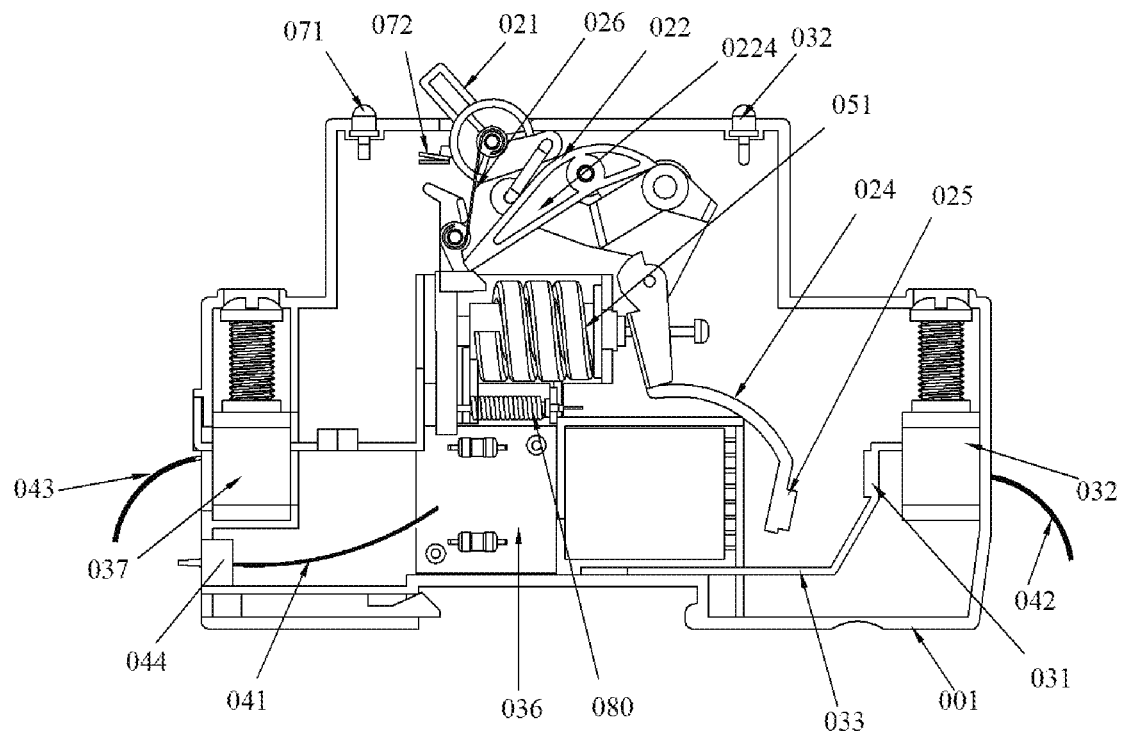
FIG. 2 is a schematic view of a remotely-controllable circuit breaker as an embodiment of the invention.

As shown in FIG. 2, a remotely-controllable circuit breaker as a first embodiment of the invention comprises a first circuit breaking unit, a remote control unit, a housing 001, a feedback circuit, a signal receiving circuit, a decoding circuit, and a parsing circuit.

The first circuit breaking unit and the remote control unit are disposed in the housing 001.

The remote control unit operates to control the interruption of the remotely-controllable circuit breaker via a remote control signal.

The housing 001 is made of insulating and flame-retardant materials.

The first circuit breaking unit operates to switch on or off loads and electric lines, and comprises a first operating portion, an arc extinguishing portion, an over-current protecting portion 051, and a first terminal 032.

The first operating portion operates to switch on or off the loads and the electric lines, the arc extinguishing portion operates to prevent arcs from corrupting the remotely-controllable circuit breaker, the overcurrent protecting portion operates to prevent overcurrent from damaging the remotely-controllable circuit breaker, and the first terminal 032 is connected to a phase line 042.

The first operating portion comprises a lever 021, a first movable contact 024, a linkage control block 022 comprising multiple linkage parts, and a static contact point 031.

One end of the lever 021 is disposed outside the housing 001 and operates to switch on or off the electric lines.

A first movable contact point 025 is disposed on one end of the first movable contact 024.

The linkage parts are hinge-connected to each other; one end of an uppermost linkage part is connected to the lever 021; and one end of a lowermost linkage part is connected to a front end of the first movable contact 024.

The static contact point 031 is connected to the first terminal 032. As the lever 021 rotates, the linkage control block 022 forces the first movable contact 024 to move, thereby implementing attachment/detachment between the first movable contact point 025 and the static contact point 031, and thus switching on or off the loads and the electric lines.

To enable a user to see the attachment/detachment between the first movable contact point 025 and the static contact point 031, a top portion of the housing 001 corresponding to the static contact point 031 is made of transparent insulating and flame-retardant materials, and a fluorescent coating is disposed on the static contact point 031 and the first movable contact point 025.

The overcurrent protecting portion 051 is an electromagnetic release disposed below the first operating portion. One end of the overcurrent protecting portion 051 is connected to the first movable contact 024, the other end thereof is connected to a support linage part of the linkage control block 052, and the other end of the linkage part 052 is connected to a support linkage part 0224 of the linkage control block 022.

When an overcurrent condition occurs on the electric lines, the overcurrent protecting portion 051 pulls the first movable contact 024 back and forces the linkage part 052 to rotate, thereby separating the support linkage part 0224 from the linkage part 052, and the first movable contact point 025 from the static contact point 031, and thus disconnecting the loads from the electric lines The arc extinguishing portion operates to prevent an arc from damaging the remotely-controllable circuit breaker, and comprises a metal plate 033 and an arc-extinguishing cover 035. The metal plate 033 is connected to the static contact point 031 and extends to the bottom of the housing 001. The arc-extinguishing cover 035 corresponds to the static contact point 031.

Figure 4:
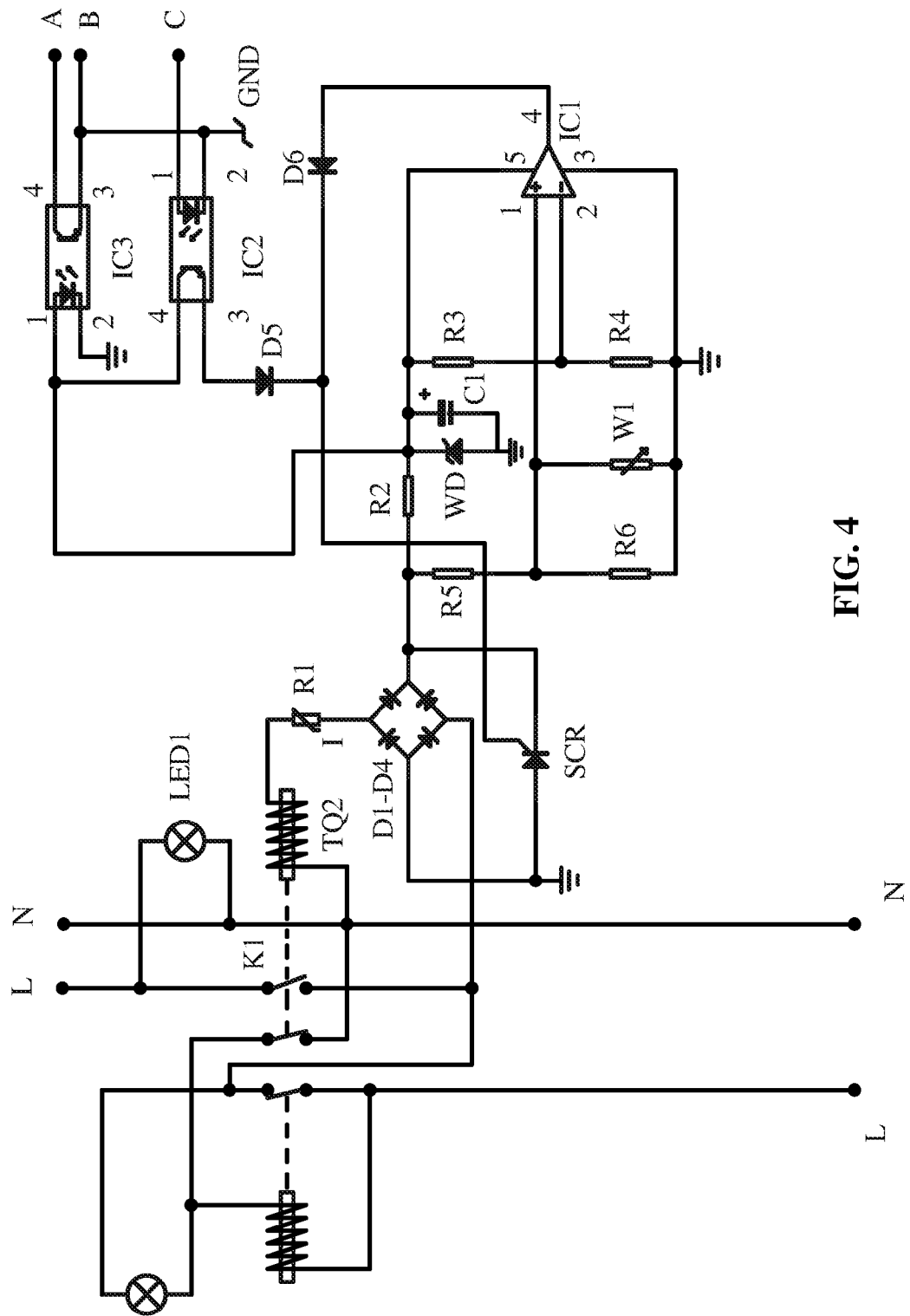
FIG. 4 is a schematic diagram of a remotely-controllable circuit breaker as a further embodiment of the invention.

As shown in FIGS. 2 and 4, the arc extinguishing portion comprises a disconnecting portion and a control circuit.

The disconnecting portion operates to disconnect the loads from the electric lines, and comprises a first electromagnet 080 (TQ2) having a magnetic core, and a first armature; the first armature is disposed below the linkage part 052; the first electromagnet 080 (TQ2) is disposed on a support in the housing 001 and below the overcurrent protecting portion 051. One end of the magnetic core abuts against the bottom of the linkage part 052.

The control circuit is connected to the disconnecting portion and operates to control the disconnecting portion. The control circuit comprises a power supply circuit and a power supply control circuit.

The power supply circuit is connected to an electromagnet coil of the disconnecting portion, thereby supplying power thereto. The power supply control circuit operates to switch on or off the power supply circuit, thereby controlling the operation of the disconnecting portion.

The power supply circuit is a rectifying circuit (D1-D4); an output end of the power supply circuit is connected to an input end of the electromagnetic coil of the first electromagnet 080 (TQ2), and an input end of the power supply circuit and an output end of the electromagnetic coil of the electromagnet are respectively connected to a phase line terminal and a zero line terminal of the electric line output terminals. An input end of the rectifying circuit (D1-D4) is connected to the phase line.

The power supply control circuit comprises a first photoelectric coupler (IC2) and a thyristor (SCR).

One output end of the first photoelectric coupler is connected to a cathode of the rectifying circuit (D1-D4), and the first photoelectric coupler operates to transmit a control signal.

The other output end of the first photoelectric coupler (IC2) is connected to a control end of the thyristor (SCR) and the other two ends of the thyristor (SCR) are connected to a cathode and an anode of the rectifying circuit (D1-D4), whereby the control circuit is switched on or off.

Operation of the circuit in FIG. 4 is as follows: As the control signal is applied to the signal input end of the first photoelectric coupler (IC2), a high potential is generated at the output end of the first photoelectric coupler (IC2), and the thyristor (SCR) is switched on. At this time, current flows through an electromagnet coil of the first electromagnet 080 (TQ2), and the first electromagnet 080 (TQ2) forces the linkage part 052 to rotate, thereby separating the support linkage part 0224 from the linkage part 052, and the first movable contact point 025 from the static contact point 031, and thus disconnecting the loads from the electric lines. As there is no control signal applied to the signal input of the first photoelectric coupler (IC2), a reset spring 026 implements connection of the loads with the electric lines.

The feedback circuit operates to transmit switch-on/switch-off information to a remote control center, and comprises a second photoelectric coupler (IC3) having an end connected to a cathode of the rectifying circuit (D1-D4), with the other end connected to the ground.

As the electric line is not disconnected and there is voltage thereon, an output end of the second photoelectric coupler (IC3) outputs a signal to the remote control center via a signal line 041 and a signal socket 044.

The signal receiving circuit operates to receive a wireless control signal from outside.

The decoding circuit is connected to the signal receiving circuit and operates to decode the wireless control signal and obtain a digital control signal.

The parsing circuit operates to parse the digital control signal, to transform the digital control signal into a voltage signal, and to transmit the voltage signal to the power supply control circuit.

Figure 3:
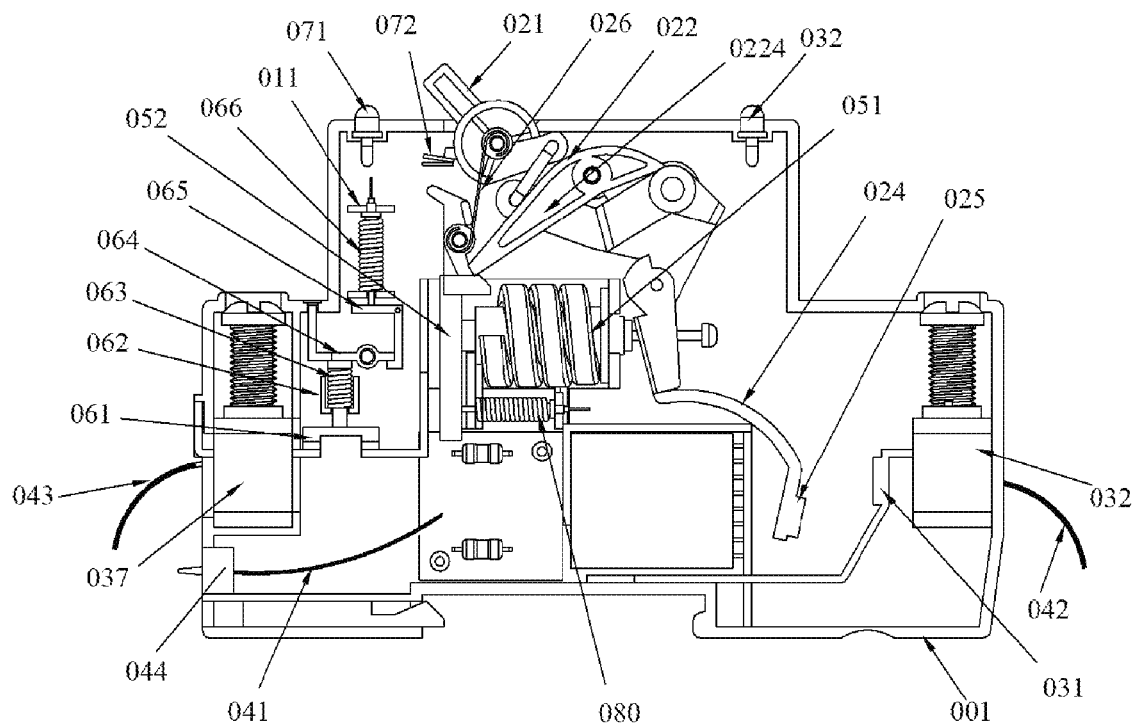
FIG. 3 is a schematic view of a remotely-controllable circuit breaker as another embodiment of the invention.

As shown in FIG. 3, the remotely-controllable circuit breaker of a second embodiment of the invention is almost the same as that of the first embodiment of the invention, except that it further comprises a second circuit breaking unit, a first indicating lamp 071, and a second indicating lamp 032. The second circuit breaking unit comprises a detecting circuit operating to detect whether the first circuit breaking unit fails, and a second operating portion operating to disconnect the loads from the electric lines when the first circuit breaking unit fails. The second circuit breaking unit and the first circuit breaking unit can be disposed on the same side in the housing 001, or on different sides therein.

The detecting circuit comprises a contact switch 072 and a second electromagnet 066. The contact switch 072 is disposed below the lever 021, and one end of the contact switch 072 is connected to the first movable contact 024 via a wire (not shown).

The second electromagnet 066 is disposed on a support 011 in the housing 001; an input end of the second electromagnet 066 is connected to the wire; and an output end of the second electromagnet 066 is connected to a zero line terminal.

As the level 021 is switched to an open circuit position, the contact switch 072 is switched on and the second electromagnet 066 operates since current flows into the coil of the second electromagnet 066 via the first movable contact 024 if a phase line is not disconnected.

The second operating portion comprises a rotatable frame 065, a rotatable plate 064, a first movable contact, and a connecting frame.

The rotatable frame 065 rotates with respect to a hinged shaft and has a lap surface. One end of the magnetic core abuts against the rotatable frame 065.

The rotatable plate 064 rotates with respect to the hinged shaft, and one end of the rotatable plate 064 abuts against the lap surface of the rotatable frame 065.

The second movable contact is disposed in a support 062 in the housing 001, and comprises a T-shaped holder 061 and a spring 063. The spring 063 is fit on the T-shaped holder 061. A conductive contact point is disposed on one end of the T-shaped holder 061; the other end of the T-shaped holder 061 abuts against the other end of the rotatable plate 064; and the spring 063 is in a compressed state under a normal condition.

A second terminal 037 is disposed in the connecting frame and connected to a phase line 043 extended from the first circuit breaking unit via a pair of stationary contact points.

Under a normal condition, the conductive contact point and the static contact points are in contact. As the detecting circuit detects the failure of the first circuit breaking unit (namely the first removable contact point 025 is not detached from the static contact point 031), current flows through the coil of the second electromagnet 066 and the magnetic core pushes the rotatable frame 065, causing it to rotate with respect to the hinged shaft. At this time an end of the rotatable plate 064 is detached from the lap surface of the rotatable frame 065 and the T-shaped holder 061 moves upward under the action of the spring 063, and thus the conductive contact point is detached from the static contact point, thereby disconnecting the phase line 042 from the phase line 043. This disconnecting process is mandatory and non-recoverable.

The first indicating lamp 071 (shown as LED2 in FIGS. 4 and 5) operates to indicate whether the switch-off function of the first circuit breaking unit fails.

The second indicating lamp 032 (shown as LED1 in FIGS. 4 and 5) is connected to the zero line and the first terminal 042, and operates to indicate whether there is voltage on the electric lines.

In this embodiment, the first indicating lamp 071 and the second indicating lamp 032 are neon lamps. In another embodiment, if other kinds of lamps are used that can only work within a limited voltage range, there will be a need for a power conversion circuit operating to convert the voltage of the electric lines and supply power to the first indicating lamp 071 and the second indicating lamp 032. Such a power conversion circuit is well-known to those skilled in the art, and will not be described hereinafter.

As shown in FIG. 4, the remotely-controllable circuit breaker of a third embodiment of the invention is almost the same as that of the second embodiment of the invention, except that it further comprises an over-voltage protecting portion and a slide rheostat W1. The over-voltage protecting portion operates to output a control signal whereby disconnecting the loads from the electric lines as over-voltage occurs on the electric lines.

The over-voltage protecting portion comprises a voltage signal sampling circuit, and an over-voltage determining circuit comprising a comparator (IC1).

The voltage signal sampling circuit is connected to a cathode of the rectifying circuit (D1-D4), thereby obtaining the voltage of the electric lines. The voltage signal sampling circuit comprises a pair of resistors (R5 and R6) serially connected to each other. A voltage sampling point is disposed between these resistors (R5 and R6).

An output end of the voltage signal sampling circuit is connected to an in-phase input end of the comparator (IC1), and a reference voltage is set on an anti-phase input end thereof. A voltage stabilizing circuit obtains the reference voltage from a cathode of the rectifying circuit (D1-D4). This voltage stabilizing circuit comprises a zener diode (WD) and a capacitor (C1) connected in parallel to each other, and operates to provide a stable voltage to the comparator (IC1).

An output end of the comparator (IC1) is connected to a control end of the thyristor (SCR).

A diode (D6) is disposed between the comparator (IC1) and the thyristor (SCR), thereby preventing current from flowing in reverse and damaging the comparator (IC1).

When the voltage on the in-phase input end of the comparator (IC1) is too high, the comparator (IC1) outputs a high potential signal, thereby switching on the thyristor (SCR), and current flows through the coil of the first electromagnet 080 (TQ2); the first electromagnet 080 (TQ2) pushes the linkage part 052, causing it to rotate with respect to the hinged shaft. At this time the support linage part 0224 is detached from the linkage part 052, and thus the first removable contact point 025 is detached from the static contact point 031, thereby disconnecting the loads from the electric lines. If no over-voltage occurs, this disconnecting process is recoverable, since a reset spring 026 exists.

The slide rheostat (W1) is disposed between the in-phase input end of the comparator (IC1) and the ground, or between the anti-phase input end of the comparator (IC1) and the ground (not shown), and operates to adjust the maximum permitted voltage. By changing the resistance value of the slide rheostat (W1), the voltage on the in-phase input end or the anti-phase input end of the comparator (IC1), and thus the over-voltage value, is adjusted.

In another embodiment, the over-voltage determining circuit comprises an analog-to-digital converter and a processor. A cathode of the rectifying circuit (D1-D4) is connected to an input end of the analog-to-digital converter, and an output end of the analog-to-digital converter is connected to an input end of the processor.

As over-voltage occurs in the electric lines, the processor switches on the thyristor, thereby switching off the electric lines. The threshold voltage of the processor can be adjusted without the slide rheostat (W1).

Figure 5:
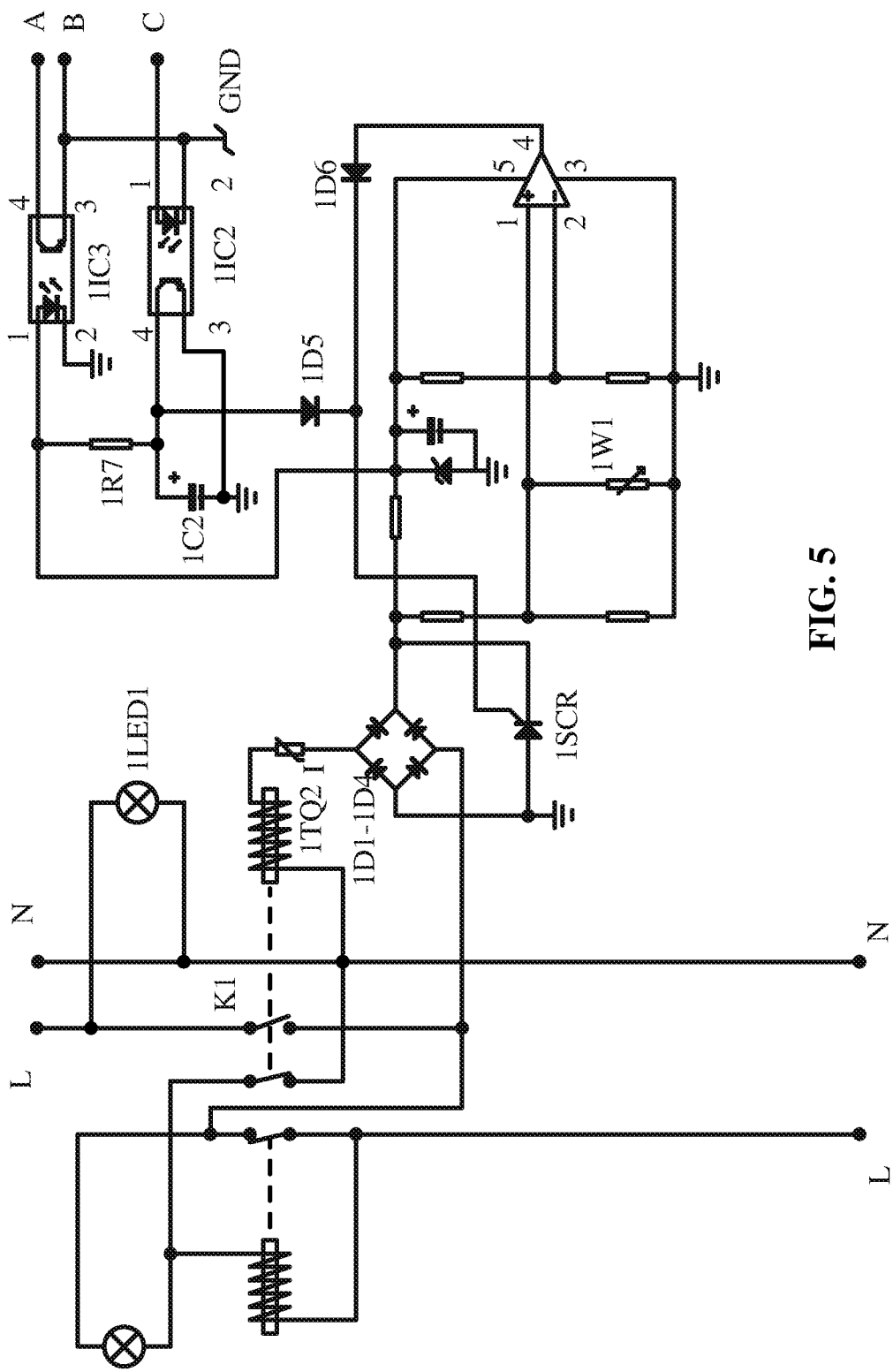
FIG. 5 is a schematic diagram of a remotely-controllable circuit breaker as still another embodiment of the invention.

As shown in FIG. 5, the remotely-controllable circuit breaker of a fourth embodiment of the invention is almost the same as that of the third embodiment of the invention, except that the power supply control circuit and the feedback circuit are different, and a delay circuit is added.

The power supply control circuit comprises a first photoelectric coupler (1IC2) and a thyristor (1SCR). One output end of the first photoelectric coupler (1IC2) is connected to a capacitor (1C2), and the first photoelectric coupler (1IC2) operates to transmit a control signal, A control end of the thyristor (1SCR) is connected to the other output end of the first photoelectric coupler (1IC2), and the other two ends of the thyristor (1SCR) are connected to the anode and the cathode of the rectifying circuit (1D1-1D4), whereby the control circuit is switched on or off. A diode (1D5) operates to prevent current from flowing in reverse and damaging the first photoelectric coupler (1IC2).

When the control signal is applied to the signal input end of the first photoelectric coupler (1IC2), a low potential is generated on an output end 4 of the first photoelectric coupler (1IC2), and remote switch-off control is not started. When there is no signal input on the control end C of the first photoelectric coupler, the thyristor (1SCR) is switched on, current flows through the coil of the first electromagnet 080 (TQ2), and the magnetic core of the first electromagnet 080 (TQ2) pushes the linkage part 052, causing it to rotate with respect to the hinged shaft. At this time, the support linkage part 0224 is detached from the linkage part 052, and thus the first removable contact point 025 is detached from the static contact point 031, thereby disconnecting the loads from the electric lines. If the control signal is applied to the signal input end of the first photoelectric coupler (1IC2), this disconnecting process is recoverable, since a reset spring 026 exists. If someone damages a remote input end, there is no voltage input on the signal input end of the first photoelectric coupler (1IC2), and the remotely-controllable circuit breaker switches off the circuit.

The delay circuit comprises a resistor (1R7) and a second photoelectric coupler (1IC3). One end of the resistor (1R7) is connected to a pin 1 of the second photoelectric coupler (1IC3), and the other end thereof is connected to a pin 4 of the first photoelectric coupler (1IC2). The delay circuit is serially connected to the capacitor (1C2), thereby generating a time delay effect and preventing erroneous operation before a remote control signal arrives.

Figure 6:
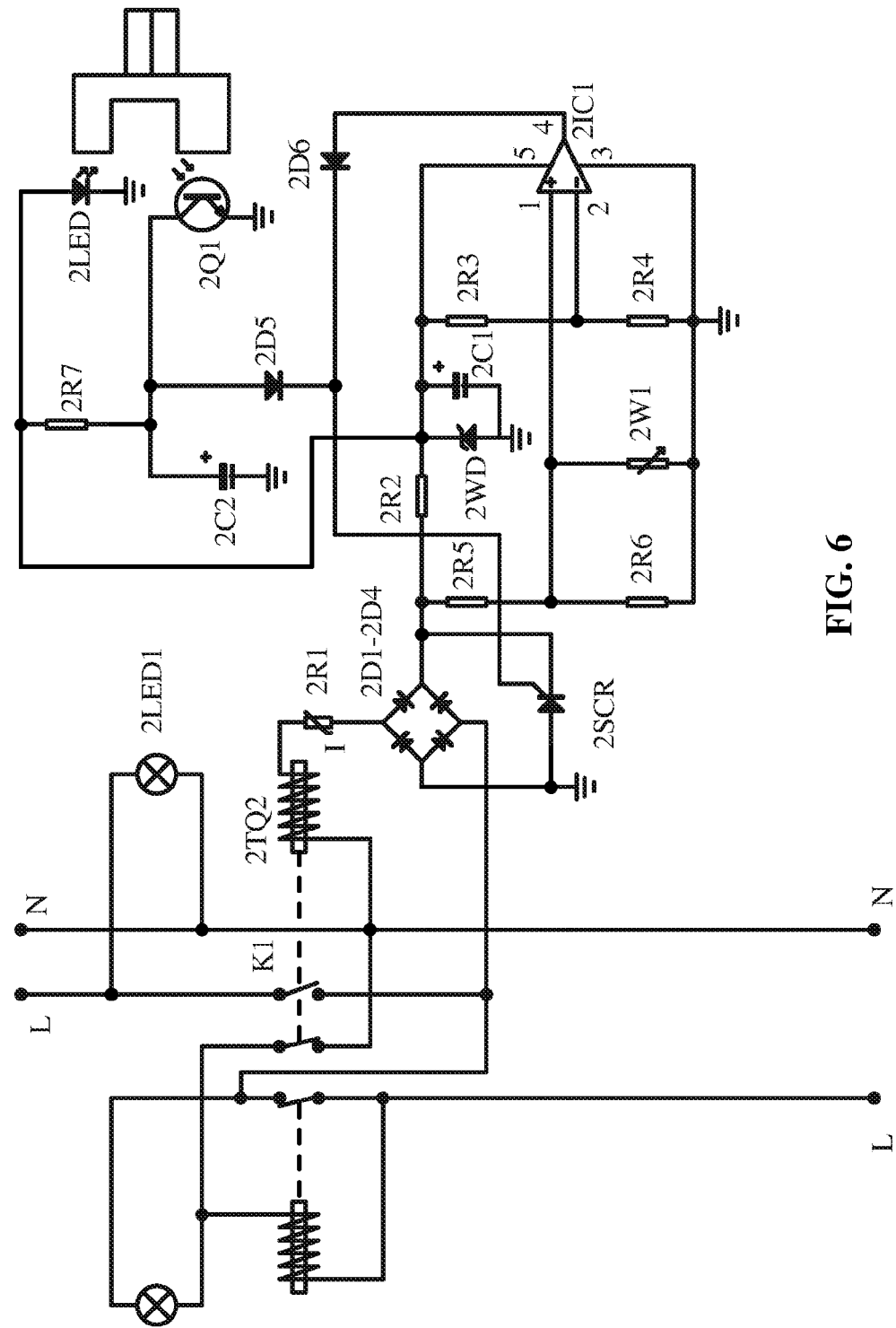
FIG. 6 is a schematic diagram of a remotely-controllable circuit breaker as yet another embodiment of the invention.

As shown in FIG. 6, the remotely-controllable circuit breaker of a fifth embodiment of the invention is almost the same as that of the fourth embodiment of the invention, except that the power supply control circuit and the feedback circuit are different, and a delay circuit is added.

The power supply control circuit comprises a photoelectric receiving tube (2Q1) and a thyristor (2SCR).

The photoelectric receiving tube (2Q1) receives an optical signal from a remote control center via optical fiber and a plug, and an output end of the photoelectric receiving tube (2Q1) is connected to the ground.

A control end of the thyristor (2SCR) is connected to the other end of the photoelectric receiving tube (2Q1), and the other two ends of the thyristor (2SCR) are connected to a cathode and an anode of the rectifying circuit (2D1-2D4), whereby the control circuit is switched on or off.

The feedback circuit comprises a light emitting diode (LED) having an end connected to a cathode of the rectifying circuit (2D1-2D4), with the other end connected to the ground. When the electric line is connected, an output end of the LED (2LED) outputs an optical signal, and the optical signal is transmitted to a remote control device via the optical fiber and the connector.

The delay circuit comprises a resistor (2R7). One end of the resistor (2R7) is connected to an end of the LED (2LED), and the other end thereof is connected to the other end of the photoelectric receiving tube (2Q1). The delay circuit is connected in series to a capacitor (2C2), whereby it generates a time delay effect and prevents erroneous operation before a remote control signal arrives.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A remotely-controllable circuit breaker, comprising:
a first circuit breaking unit;
a remote control unit; and
a housing;
wherein:
said first circuit breaking unit comprises a first operating portion, an arc extinguishing portion, an overcurrent protecting portion, and a first terminal;
said first circuit breaking unit and said remote control unit are disposed in said housing;
said remote control unit operates to control an interruption of the remotely-controllable circuit breaker via a remote control signal;
said housing is made of insulating and flame-retardant materials;
said first circuit breaking unit operates to switch on or off loads and electric lines;
said first operating portion operates to switch on or off said loads and said electric lines;
said arc extinguishing portion operates to prevent arcs from damaging the remotely-controllable circuit breaker;
said overcurrent protecting portion operates to prevent overcurrent from burning the remotely-controllable circuit breaker; and
said first terminal is connected to a phase line.

2. The remotely-controllable circuit breaker of claim 1, wherein
said first operating portion comprises a lever, a first movable contact, a linkage control block comprising multiple linkage parts, and a static contact point;
one end of said lever is disposed outside said housing and operates to switch on or off said electric lines;
a first movable contact point is disposed on one end of said first movable contact;
said linkage parts are hinge-connected to each other;
one end of an uppermost linkage part is connected to said lever;
one end of a lowermost linkage part is connected to a front end of said first movable contact;
said static contact point is connected to said first terminal; and
a fluorescent coating is disposed on said static contact point and said first movable contact point.

3. The remotely-controllable circuit breaker of claim 2, wherein
said overcurrent protecting portion is disposed below said first operating portion;
one end of said overcurrent protecting portion is connected to said first movable contact;
the other end thereof is connected to a support linkage part of the linkage control block;
said overcurrent protecting portion is an electromagnetic release; and
said overcurrent protecting portion separates said first movable contact point from said static contact point, thereby disconnecting said loads from said electric lines when an overcurrent occurs on said electric lines.

4. The remotely-controllable circuit breaker of claim 1, wherein
said remote control unit comprises a disconnecting portion and a control circuit;
said disconnecting portion operates to disconnect said loads from said electric lines; and
said control circuit is connected to said disconnecting portion and operates to control said disconnecting portion.

5. The remotely-controllable circuit breaker of claim 4, wherein
said disconnecting portion comprises a first electromagnet having a magnetic core, and a first armature;
said first armature is disposed below said linkage parts; and
one end of said first electromagnet corresponds to said first armature.

6. The remotely-controllable circuit breaker of claim 4, wherein
said control portion comprises a power supply circuit, and a power supply control circuit;
said power supply circuit is connected to an electromagnetic coil of said disconnecting portion, whereby it supplies power thereto; and said power supply control circuit operates to switch on or off said power supply circuit, thereby controlling an operation of said disconnecting portion.

7. The remotely-controllable circuit breaker of claim 6, wherein
said power supply circuit is a rectifying circuit;
an output end of said power supply circuit is connected to an input end of said electromagnetic coil; and
an input end of said power supply circuit and an output end of said electromagnetic coil are respectively connected to a phase line terminal and a zero line terminal of output terminals of said electric lines.

8. The remotely-controllable circuit breaker of claim 7, wherein
said power supply control circuit comprises a first photoelectric coupler and a thyristor;
one output end of said first photoelectric coupler is connected to a cathode of said power supply circuit;
said first photoelectric coupler operates to transmit a control signal;
the other output end of said first photoelectric coupler is connected to a control end of said thyristor; and
the other two ends of said thyristor are connected to a cathode and an anode of said power supply circuit, whereby said control circuit is switched on or off.

9. The remotely-controllable circuit breaker of claim 8, further comprising an over-voltage protecting portion operating to output a control signal whereby said loads are disconnected from said electric lines when an over-voltage occurs on said electric lines.

10. The remotely-controllable circuit breaker of claim 9, wherein
said over-voltage protecting portion comprises a voltage signal sampling circuit, and an over-voltage determining circuit comprising a comparator;
said voltage signal sampling circuit is connected to a cathode of said rectifying circuit, thereby obtaining the voltage of said electric lines;
an output end of said voltage signal sampling circuit is connected to an in-phase input end of said comparator;
an output end of said comparator is connected to a control end of said thyristor; and
said comparator enables the disconnecting portion to disconnect said loads from said electric lines when the voltage on said in-phase input end of said comparator exceeds a reference voltage on an anti-phase input end thereof.

11. The remotely-controllable circuit breaker of claim 10, further comprising a slide rheostat operating to adjust a maximum permitted voltage.

12. The remotely-controllable circuit breaker of claim 11, wherein said slide rheostat is disposed between said in-phase input end of said comparator and a ground, or between said anti-phase input end of said comparator and the ground.

13. The remotely-controllable circuit breaker of claim 10, wherein
said over-voltage determining circuit further comprises an analog-to-digital converter and a processor;
said cathode of said rectifying circuit is connected to an input end of said analog-to-digital converter;
an output end of said analog-to-digital converter is connected to an input end of said processor; and
said processor switches on or off said thyristor.

14. The remotely-controllable circuit breaker of claim 7, wherein
said power supply control circuit comprises a first photoelectric coupler and a thyristor;
one control end of said first photoelectric coupler is connected to a ground;
said first photoelectric coupler operates to transmit a control signal;
the other output end of said first photoelectric coupler is connected to a control end of said thyristor;
the other output end of said first photoelectric coupler is connected to an end of said capacitor;
the other end of said capacitor is connected to the ground;
the other two ends of said thyristor are connected to a cathode and an anode of said power supply circuit, whereby said control circuit is switched on or off.

15. The remotely-controllable circuit breaker of claim 14, further comprising an over-voltage protecting portion operating to output a control signal whereby said loads are disconnected from said electric lines when an over-voltage occurs on said electric lines.

16. The remotely-controllable circuit breaker of claim 15, wherein
said over-voltage protecting portion comprises a voltage signal sampling circuit, and an over-voltage determining circuit comprising a comparator;
said voltage signal sampling circuit is connected to a cathode of said rectifying circuit, thereby obtaining the voltage of said electric lines;
an output end of said voltage signal sampling circuit is connected to an in-phase input end of said comparator;
an output end of said comparator is connected to said control end of said thyristor; and
said comparator enables the disconnecting portion to disconnect said loads from said electric lines when the voltage on said in-phase input end of said comparator exceeds the reference voltage on an anti-phase input end thereof.

17. The remotely-controllable circuit breaker of claim 16, further comprising a slide rheostat operating to adjust a maximum permitted voltage.

18. The remotely-controllable circuit breaker of claim 17, wherein said slide rheostat is disposed between said in-phase input end of said comparator and the ground, or between said anti-phase input end of said comparator and the ground.

19. The remotely-controllable circuit breaker of claim 16, wherein
said over-voltage determining circuit further comprises an analog-to-digital converter and a processor;
said cathode of said rectifying circuit is connected to an input end of said analog-to-digital converter;
an output end of said analog-to-digital converter is connected to an input end of said processor; and
said processor switches on or off said thyristor.

20. The remotely-controllable circuit breaker of claim 7, wherein
said power supply control circuit comprises a photoelectric receiving tube and a thyristor;
said photoelectric receiving tube receives an optical signal from a remote control center via an optical fiber and a connector;
an output end of said photoelectric receiving tube is connected to a ground;
a control end of said thyristor is connected to the other end of said photoelectric receiving tube;
the other two ends of said thyristor are connected to a cathode and an anode of said power supply circuit, whereby said control circuit is switched on or off.

21. The remotely-controllable circuit breaker of claim 20, further comprising an over-voltage protecting portion operating to output a control signal whereby said loads are disconnected from said electric lines when an over-voltage occurs on said electric lines.

22. The remotely-controllable circuit breaker of claim 21, wherein
said over-voltage protecting portion comprises a voltage signal sampling circuit, and an over-voltage determining circuit comprising a comparator;
said voltage signal sampling circuit is connected to a cathode of said rectifying circuit, thereby obtaining the voltage of said electric lines;
an output end of said voltage signal sampling circuit is connected to an in-phase input end of said comparator;
an output end of said comparator is connected to said control end of said thyristor; and
said comparator enables the disconnecting portion to disconnect said loads from said electric lines when the voltage on said in-phase input end of said comparator exceeds the reference voltage on an anti-phase input end thereof.

23. The remotely-controllable circuit breaker of claim 22, further comprising a slide rheostat operating to adjust a maximum permitted voltage.

24. The remotely-controllable circuit breaker of claim 23, wherein said slide rheostat is disposed between said in-phase input end of said comparator and the ground, or between said anti-phase input end of said comparator and the ground.

25. The remotely-controllable circuit breaker of claim 22, wherein
said over-voltage determining circuit further comprises an analog-to-digital converter and a processor;
said cathode of said rectifying circuit is connected to an input end of said analog-to-digital converter;
an output end of said analog-to-digital converter is connected to an input end of said processor; and
said processor switches on or off said thyristor.

26. The remotely-controllable circuit breaker of claim 6, further comprising a feedback circuit, comprising a light emitting diode (LED) having an end connected to a cathode of said power supply circuit, with the other end connected to a ground.

27. The remotely-controllable circuit breaker of claim 26, wherein an output end of said LED outputs an optical signal, and transmits said optical signal to a remote control device via said optical fiber and said connector when said electric lines are connected.

28. The remotely-controllable circuit breaker of claim 6, further comprising a feedback circuit, comprising a second photoelectric coupler having an end connected to a cathode of said power supply circuit, with the other end connected to a ground.

29. The remotely-controllable circuit breaker of claim 28, wherein an output end of said second photoelectric coupler outputs a switching signal to a remote control device when said electric lines are connected.

30. The remotely-controllable circuit breaker of claim 6, further comprising
a signal receiving circuit operating to receive a wireless control signal from outside;
a decoding circuit connected to said signal receiving circuit and operating to decode said wireless control signal and to obtain a digital control signal; and
a parsing circuit operating to parse said digital control signal, to transform said digital control signal into a voltage signal, and to transmit said voltage signal to said power supply control circuit.

31. The remotely-controllable circuit breaker of claim 2, further comprising a second circuit breaking unit operating to disconnect said loads from said electric lines when said first circuit breaking unit fails.

32. The remotely-controllable circuit breaker of claim 31, wherein said second circuit breaking unit comprises
a detecting circuit operating to detect whether said first circuit breaking unit fails; and
a second operating portion operating to disconnect said loads from said electric lines when said first circuit breaking unit fails.

33. The remotely-controllable circuit breaker of claim 32, wherein
said detecting circuit comprises a contact switch and a second electromagnet;
said contact switch is disposed below said lever;
one end of said contact switch is connected to an end of said first movable contact via a wire;
said second electromagnet is disposed on a support in said housing;
an input end of said second electromagnet is connected to said wire;
an output end of said second electromagnet is connected to a zero line terminal;
said contact switch is switched on when said lever is switched to an open circuit position; and
said second electromagnet operates when no phase line is disconnected.

34. The remotely-controllable circuit breaker of claim 33, wherein
said second operating portion comprises a rotatable frame, a rotatable plate, a second movable contact, and a connecting frame;
said rotatable frame rotates with respect to a hinged shaft and has a lap surface;
one end of said magnetic core abuts against said rotatable frame;
said rotatable plate rotates with respect to said hinged shaft;
one end of said rotatable plate abuts against said lap surface of said rotatable frame;
said second movable contact is disposed in said support, and comprises a T-shaped holder and a spring;
said spring is fit on said T-shaped holder;
a conductive contact point is disposed on one end of said T-shaped holder;
the other end of said T-shaped holder abuts against the other end of said rotatable plate; and
a second terminal is disposed in said connecting frame and connected to said phase line via a pair of stationary contact points.

35. The remotely-controllable circuit breaker of claim 2, wherein a top portion of said housing corresponding to said static contact point is made of transparent, insulating, and flame-retardant materials.

36. A remotely-controllable circuit breaker, comprising:
a first circuit breaking unit;
a remote control unit; and
a housing;
wherein:
said first circuit breaking unit and said remote control unit are disposed in said housing;
said first circuit breaking unit operates to switch on or off loads and electric lines;
said remote control unit operates to control an interruption of the remotely-controllable circuit breaker via a remote control signal;

said housing is made of insulating and flame-retardant materials;
a first indicating lamp operating to indicate whether a switch-off function of said first circuit breaking unit fails;
a second indicating lamp connected to a zero line terminal and a first terminal, and operating to indicate whether there is voltage on said electric lines; and
a power conversion circuit operating to convert the voltage of said electric lines whereby power is supplied to said first indicating lamp and said second indicating lamp.

37. The remotely-controllable circuit breaker of claim 1, wherein said housing is made of transparent materials.

38. A circuit breaker for remotely connecting and disconnecting loads to and from electric lines connected to the circuit breaker, the circuit breaker comprising:
a first circuit breaking unit;
a remote control unit; and
a housing;
wherein:
said first circuit breaking unit comprises a first operating portion, an arc extinguishing portion, an overcurrent protecting portion, and a first terminal;
said first circuit breaking unit and said remote control unit are disposed in said housing;
said remote control unit operates to control an interruption of the circuit breaker via a remote control signal;
said first operating portion operates to switch on or off loads from electric lines connected to the circuit breaker;
said arc extinguishing portion operates to prevent arcs from damaging the remotely-controllable circuit breaker;
said overcurrent protecting portion operates to prevent overcurrent from burning the remotely-controllable circuit breaker; and
said first terminal is connected to a phase line.

* * * * *